Sept. 8, 1953  H. B. TAYLOR  2,651,228
DISENGAGING MECHANISM FOR MULTIPLE NUT RUNNERS
Filed Nov. 1, 1951

INVENTOR
HUGH B. TAYLOR
BY
HIS ATTORNEY

Patented Sept. 8, 1953

2,651,228

UNITED STATES PATENT OFFICE 2,651,228

DISENGAGING MECHANISM FOR MULTIPLE NUT RUNNERS

Hugh B. Taylor, Waverly, N. Y., assignor to Ingersoll-Rand Company, New York, N. Y., a corporation of New Jersey Application November 1, 1951, Serial No. 254,324

6 Claims. (Cl. 81—54)

This invention relates to multiple nut runners, and more particularly to a device for disengaging a multiple nut runner from a work piece.

The multiple nut runner—several nut runners mounted on a frame—is designed to operate, normally, on one type of work piece only, and to tighten, or loosen, a plurality of screws or nuts in one operation. Such runners find their principal use in assembly line operations or under similar circumstances wherein there are numerous work pieces on which are similarly located a plurality of nuts, screws, bolts and the like to be tightened or loosened.

Nut runners now on the market are powered either by electric or air motors. Where the nut runners are powered by air motors, the usual practice is to tighten the nut until the motor stalls in order to insure that each nut is tightened by a predetermined amount of torque. One difficulty encountered with such a multiple nut runner is that although the air supply to the motors is cut off at the end of the tightening operation, air trapped in the motor continues to exert a force tending to tighten the nut. This force binds the sockets on the nuts so that considerable effort is required on the part of the operator to disengage the runner from the work. Also, in some assembly lines, the work piece merely lies free on a conveyor belt and the operator, in such case, is required to pull or jar the work piece free of the runner.

It is, accordingly, one object of this invention to provide a power operated mechanism for disengaging a multiple nut runner from its work.

Another object of this invention is to provide a mechanism simple in design and efficient in operation for disengaging the nut runner from its work.

A further object of this invention is to disengage the runner from a work piece in a quick but smooth manner to avoid jerking of the operator.

Figure 1:
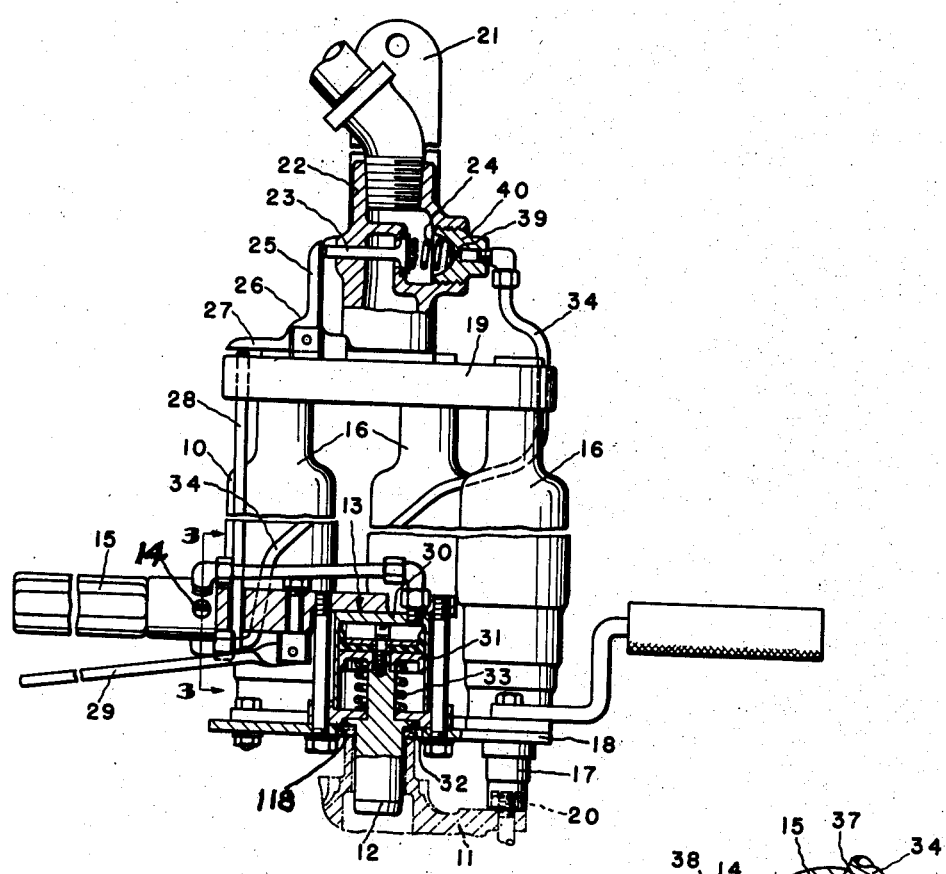
Figure 3:
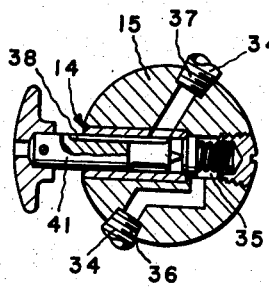
Figure 2:
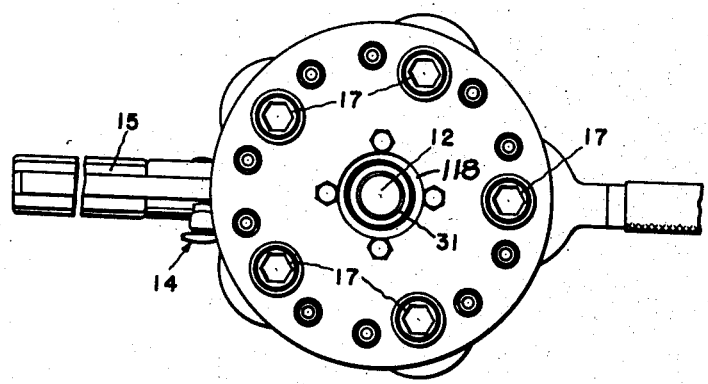

Further objects of this invention will become obvious in the following specification and drawings, in which, Figure 1 is a side view, partly in section, of a multiple nut runner and the disengaging mechanism therefor, Fig. 2 is an end view of the nut runner, and Fig. 3 is a sectional view taken through Fig. 1 along line 3—3 looking in the direction of the arrows, and shows the valve for controlling the flow of power for operating the disengaging mechanism.

Referring to the drawings, Figure 1 shows a multiple nut runner, designated in its entirety by the numeral 10, mounted in its operative position on a work piece 11 (shown in part in broken lines). A plunger 12 mounted on the nut runner is connected to be actuated by a power element, or servo-mechanism, 13 to engage the work piece 11 for disengaging the runners from the work piece. In the form of the invention shown, the plunger 12 serves also as a pilot member and slidably engages the work piece for positioning the nut runners relative to the work piece 11. A valve 14 mounted on a handle 15 of the runner controls the supply of power to actuate the power element to extend the plunger, or pilot, 12 to disengage the nut runner from the work piece. The multiple nut runner is then in condition to be rotated into a second operative position on the same work piece, or placed on another work piece. Whenever the valve 14 moves to cut off the supply of power to the power element 13, the pilot 12 is retracted and the runner moves into engagement with the work.

Referring in greater detail to the construction of the nut runner, the multiple nut runner shown for the purpose of illustration comprises a plurality of air driven nut runners 16 mounted on a frame which includes plates 18 and 19 secured at opposite end portions of the runners 16 for holding the runners in position relative to each other; the relative positions of each runner 16 being determined by the location of the members, such as the nut 20, to be tightened on the work piece 11. Secured to the back plate 19 is an arm 21 adapted to be connected to a rope, or line (not shown), which may be secured at a point above the work piece for supporting the multiple nut runner. A conduit 22 also secured to the back plate 19 is provided for connection with a source of pressure fluid (not shown) for powering the runners 16.

Flow of pressure fluid through the conduit 22 to the runners 16 is controlled by a valve 23 which is held in its closed position by means of a spring 24 and is actuated into its open position by the arm 25 of a bell crank 26 pivoted on the back plate 19. The other arm 27 of the bell crank 26 abuts the end of a rod 28 slidably supported at its opposite ends by the end plate 19 and the handle 15. A lever 29 pivoted at one end on the handle 15 abuts the end of the rod 28 extending through the handle 15 such that movement of the lever 29 towards the handle 15 rotates the bell crank 26 to open the valve 23.

Referring now to the construction of the disengaging mechanism 13, a cylinder 30 mounted on the plate 18 houses a reciprocative piston 31 secured to the end of the plunger, or pilot, 12 extending through the lower end of the cylinder 30. Pressure fluid is conducted from the conduit 22 through a conduit 34 into the upper end of the cylinder 30 for actuating the piston 31 to drive the pilot 12 through an opening 118 in the plate 18 and into engagement with the work piece 11 to disengage the runner from its work. The pilot 12, in the form of the invention illustrated, is provided with a shoulder, or flange, 32 which engages the work piece 11 to disengage the sockets 17 of the nut runners from the nuts 20.

The flow of pressure fluid to actuate the piston 31 is controlled by the valve 14 which, for convenience of operation by the operator, is mounted in the handle 15. This valve may be of any conventional form, and is illustrated as a push-button type valve which, in one position, depressed, communicates the ends 36 and 37 of the conduit 34 terminating in a bore 35 in the handle 15. In this valve position pressure fluid enters the cylinder 30 to drive the piston 31 on its power stroke. In the other valve position, released, the valve 14 cuts off communication between the ends 36 and 37 of the conduit 34 and communicates the end 37, and hence the cylinder 30, with the atmosphere through a groove 38 in the valve stem 41. A spring 33 interposed between the piston 31 and the lower end of the cylinder 30 may then return the piston and retract the pilot 12.

In order to avoid jerking or violent disengagement of the nut runner from the work piece, as might occur if full line air pressure were suddenly exposed to the end of the piston 31, means are provided to restrict the flow of pressure fluid for actuating the piston 31. In the form of the invention shown, this means is illustrated as an orifice 39 formed in the connector 40 for connecting the conduit 34 to the conduit 22.

Reviewing the operation of the multiple nut runner and the disengaging mechanism, the operator, after sliding the pilot 12 into engagement with the work piece 11 and positioning the multiple nut runner such that the sockets 17 are in position to engage the nuts 20, grips the lever 29 to the handle 15 thereby lifting the valve 23 to admit compressed air to drive the nut runners 16 and tighten the nuts 20. Once the nuts 20 are tightened, the lever 29 is released to cut off the power supply to the nut runners and the operator depresses the valve 14 to valve air into the cylinder 30, driving the piston 31 towards the work piece, thereby moving the shoulder 32 into engagement with the work piece and lifting, or pushing, the nut runner away from the work piece 11 to disengage the sockets 17 from the nuts 20.

Inasmuch as the air passing through the orifice 39 experiences a pressure drop, the pressure in the cylinder 30 does not suddenly build up to line pressure, but increases smoothly to line pressure so that the force exerted by the piston 31 on the pilot smoothly disengages the multiple runner from the work piece. The orifice 39 does not delay, to a noticeable extent, the rapid disengagement of the nut runner from the work piece, but prevents the plunger 12 from striking a sharp blow, jerking the nut runner.

While I have shown and described a specific form of my invention, it is to be understood that various changes and modifications may be made without departing from the spirit of the invention as set forth in the appended claims.

I claim:

1. In a multiple nut runner, nut runners adapted to rotate members of a work piece, a frame for securing the nut runners in position relative to each other, a power element mounted on the frame, a plunger positioned to engage the work piece and connected to be actuated by the power element to disengage the runners from the members rotated thereby, and means for controlling the flow of power to actuate the power element.

2. In a multiple nut runner, nut runners adapted to rotate members of a work piece, a frame for securing the nut runners in position relative to each other, a power element mounted on the frame, a plunger positioned to engage the work piece and connected by the power element to disengage the nut runners from the members rotated thereby, a valve for controlling the flow of power to actuate the power element, and means to restrict the flow of power for actuating said power element.

3. In a multiple nut runner, nut runners adapted to rotate members of a work piece, a frame for the runners, a servo-mechanism mounted on the frame, a pilot adapted to slidably engage the work piece for positioning the nut runners relative to the work piece and connected to be actuated by the servo-mechanism to disengage the nut runners from the members rotated thereby, means for controlling the flow of power to actuate the servo-mechanism, and means for restricting such flow of power to the servo-mechanism.

4. A multiple nut runner comprising nut runners adapted to rotate members of a work piece, a frame for holding the nut runners in position relative to each other, a cylinder secured to the frame, a piston reciprocable in the cylinder, means for supplying power to actuate said piston, a pilot adapted to slidably engage the work piece for positioning said runners relative to the work piece and connected to said piston to be actuated thereby for disengaging the nut runners from the members rotated thereby, and a valve for controlling the flow of power to actuate the piston.

5. A multiple nut runner comprising nut runners adapted to rotate members of a work piece, a frame for holding the nut runners in position relative to each other, a cylinder secured to the frame, a piston reciprocable in the cylinder, a plunger positioned to engage the work piece and connected to said piston to be actuated thereby for disengaging the nut runners from the members rotated thereby, means for supplying pressure fluid for actuating said piston, a valve for controlling the flow of such pressure fluid, and means for restricting the flow of pressure fluid through the last said means.

6. A multiple nut runner comprising nut runners adapted to rotate members of a work piece, a frame for securing the nut runners in position relative to each other, a cylinder secured to the frame, a piston reciprocable in the cylinder, means for supplying pressure fluid to the cylinder to actuate the piston, a pilot adapted to slidably engage the work piece for positioning the nut runners relative to the work piece and connected to be actuated by the piston, a shoulder on the pilot adapted to engage the work piece whenever the pilot is actuated so as to disengage the nut runners from the members rotated thereby, and a valve for controlling the flow of power to actuate the piston.

HUGH B. TAYLOR.

References Cited in the file of this patent

UNITED STATES PATENTS

| Number | Name | Date |
|---|---|---|
| 1,204,501 | Shipley | Nov. 14, 1916 |
| 1,823,426 | Ferris | Sept. 15, 1931 |
| 2,069,882 | Hall | Feb. 9, 1937 |
| 2,106,365 | Liano | Jan. 25, 1938 |